United States Patent
Carpenter

(10) Patent No.: US 8,013,728 B2
(45) Date of Patent: Sep. 6, 2011

(54) SYSTEM AND METHOD FOR PROVIDING EMERGENCY WARNINGS FOR A ROLLOVER VEHICLE

(76) Inventor: Eric George Carpenter, Chatsworth, CA (US)

( * ) Notice: Subject to any disclaimer, the term of this patent is extended or adjusted under 35 U.S.C. 154(b) by 485 days.

(21) Appl. No.: 12/125,821

(22) Filed: May 22, 2008

(65) Prior Publication Data

US 2008/0291003 A1 Nov. 27, 2008

Related U.S. Application Data

(60) Provisional application No. 60/931,120, filed on May 22, 2007.

(51) Int. Cl.
*B60Q 1/22* (2006.01)
(52) U.S. Cl. ........ 340/463; 340/440; 340/468; 340/471; 340/689
(58) Field of Classification Search .................. 340/463, 340/440, 438, 471, 686.1, 689; 701/71, 45, 701/124; 280/734, 5.506, 5.507
See application file for complete search history.

(56) References Cited

U.S. PATENT DOCUMENTS

| | | | | |
|---|---|---|---|---|
| 4,539,548 A | * | 9/1985 | Crites | 340/428 |
| 4,952,908 A | * | 8/1990 | Sanner | 340/429 |
| 5,585,784 A | | 12/1996 | Pabla et al. | |
| 6,038,495 A | * | 3/2000 | Schiffmann | 701/1 |
| 6,185,489 B1 | | 2/2001 | Strickler | |
| 6,262,658 B1 | * | 7/2001 | O'Connor | 340/440 |
| 6,397,133 B1 | * | 5/2002 | van der Pol et al. | 701/37 |
| 6,456,194 B1 | | 9/2002 | Carlson et al. | |
| 6,861,949 B2 | | 3/2005 | Carlson et al. | |
| 6,873,253 B2 | * | 3/2005 | Veziris | 340/441 |
| 7,129,826 B2 | * | 10/2006 | Nitz et al. | 340/436 |
| 7,261,303 B2 | * | 8/2007 | Stefan et al. | 280/5.5 |
| 7,641,369 B1 | * | 1/2010 | Deveau et al. | 362/464 |
| 2005/0275516 A1 | * | 12/2005 | Lang | 340/440 |
| 2006/0022812 A1 | * | 2/2006 | Lang | 340/440 |
| 2006/0202808 A1 | | 9/2006 | Obradovich | |

OTHER PUBLICATIONS

European Search Report dated Aug. 1, 2008, for European Application No. PCT/US 08/64576, indicating relevance of listed references on this IDS.

* cited by examiner

*Primary Examiner* — Toan N Pham
(74) *Attorney, Agent, or Firm* — Christie, Parker & Hale, LLP.

(57) ABSTRACT

A system and method for providing emergency warnings for a rollover vehicle is provided. In one embodiment, the invention relates to a warning system for an automobile including a power source configured to provide a current, a control circuit coupled to the power source, at least one position sensor coupled to the control circuit, the at least one position sensor configured to detect at least one position of the automobile with respect to a ground surface, and at least one light source coupled to the control circuit, wherein the control circuit is configured to control current flow to the at least one light source based on the at least one position.

21 Claims, 5 Drawing Sheets

SYSTEM AND METHOD FOR PROVIDING EMERGENCY WARNINGS FOR A ROLLOVER VEHICLE

CROSS REFERENCE TO RELATED APPLICATIONS

The present application claims the benefit of Provisional Application No. 60/931,120, filed May 22, 2007, entitled "EMERGENCY ROLL-OVER VEHICLE AWARENESS LIGHTS", the contents of which are expressly incorporated herein by reference in their entirety.

FIELD OF THE INVENTION

The present invention relates to a system and method for providing emergency warnings for a vehicle that has rolled over. More specifically, the invention relates to a system for warning automobile drivers, including emergency personnel, when an automobile is involved in a rollover accident.

BACKGROUND OF THE INVENTION

Drivers of motor vehicles commonly activate hazard lights in the event of a traffic accident or mechanical breakdown. Such hazard lights are effective provided that the driver remains in a conscious state following a traffic accident and is physically able to manually activate the hazard light system. In the case of vehicle rollovers, which can occur on conventional roadways and highways or in remote locations such as hill sides and ravines, drivers are often rendered unconscious or physically incapable of moving their arms or legs. In these physical states, drivers are unable to activate any manual warning device, such as the hazard lights, or otherwise call for help. This accident condition poses many safety hazards to human life, not only for the driver of the affected vehicle, but also for other drivers and emergency vehicles in oncoming traffic, which may be unaware of the disabled vehicle. These hazard conditions often arise at night when the visibility of accident vehicles may be limited. Depending on the orientation of the accident vehicle, vehicle lights may be completely obscured or inoperable due to the accident.

SUMMARY OF THE INVENTION

The invention generally relates to a system and method for providing emergency warnings for a rollover vehicle. In one embodiment, the invention relates to a warning system for an automobile including a power source configured to provide a current, a control circuit coupled to the power source, at least one position sensor coupled to the control circuit, the at least one position sensor configured to detect at least one position of the automobile with respect to a ground surface, and at least one light source coupled to the control circuit, wherein the control circuit is configured to control current flow to the at least one light source based on the at least one position.

In another embodiment, the invention relates to a method of generating a warning concerning a condition of an automobile, the method including receiving power from a power source, receiving information indicative of at least one position of the automobile, where the at least one position comprises resting on a side of the automobile, providing power, based on the at least one position, to a light source.

DETAILED DESCRIPTION OF THE INVENTION

Embodiments of the present invention include systems and methods for warning automobile drivers of a vehicle involved in a rollover accident. In some embodiments, the warning system includes fully automatic emergency situation LED lights mounted to the bottom of automobile. The lights can be automatically activated in the event that the automobile is involved in a rollover traffic accident. The emergency lights can be hard-wired to a position sensing switch, for example a mercury switch, which, when activated, enables the LED lights to automatically flash for an extended period of time. The activated emergency lights will alert oncoming motorists of the disabled vehicle's position in traffic. The lights can be powered by an external battery pack that furnishes power independent of the standard battery of the vehicle. In one embodiment, all of the emergency warning system components (e.g., battery pack, mercury switch, wires and lights) are mounted underneath the vehicle to the frame.

In some embodiments, a set of flashing LED indicator lights are automatically activated once the position sensing switch has detected that the vehicle is no longer in an upright position. The entire system can be affixed to the bottom of any motor vehicle (e.g., a car, a truck or a tractor-trailer), and once activated, can immediately activate the indicator lights, thereby alerting oncoming traffic, including emergency response vehicles, that the vehicle is incapacitated and immobile. In other embodiments, the warning system is affixed to other parts of the vehicle or integrated with the existing or standard automobile lighting systems that are a part of the automobile after it has been assembled by the original manufacturer.

Figure 1:
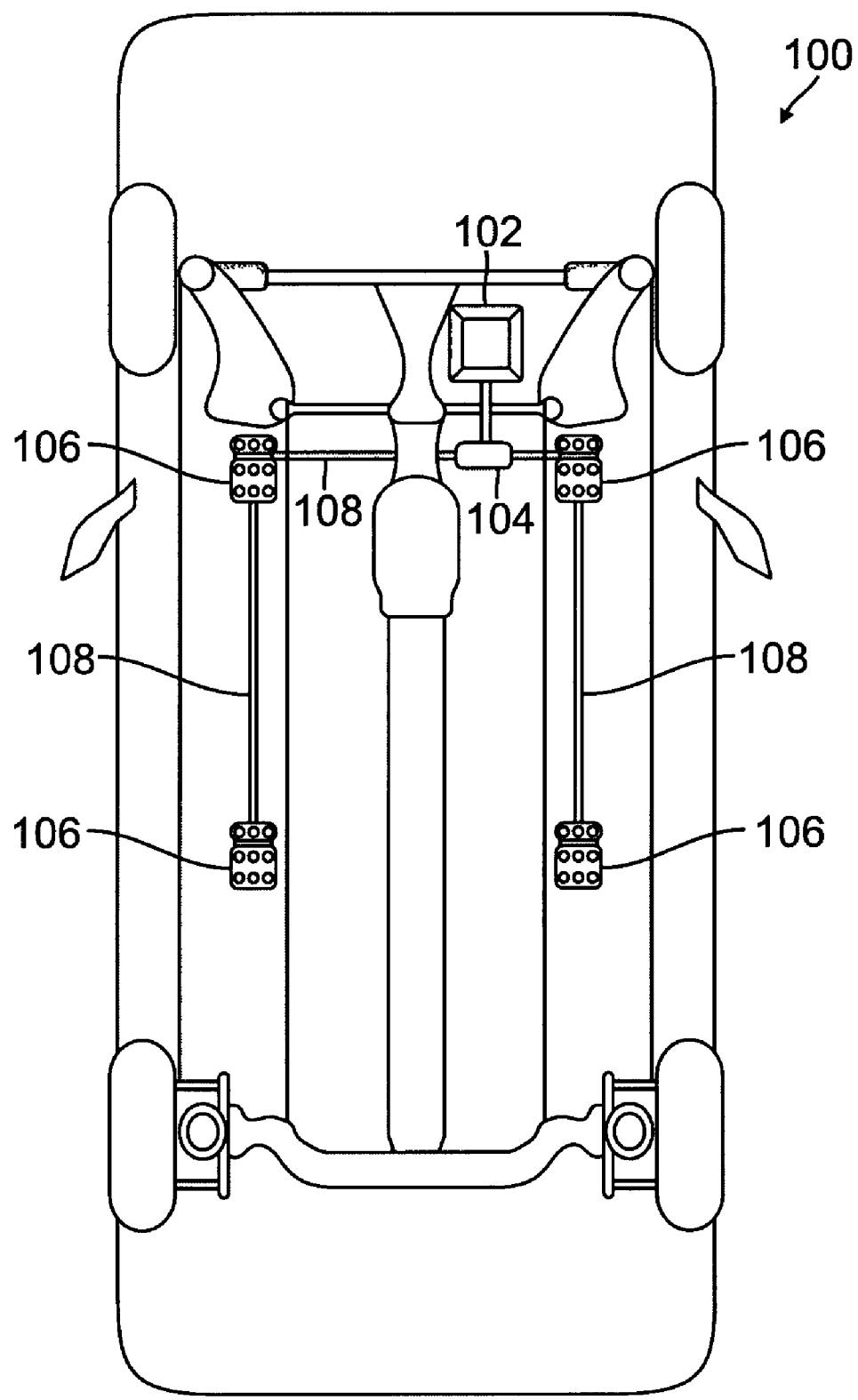
FIG. 1 is a bottom view of an automobile having an emergency warning system in accordance with an embodiment of the present invention.

FIG. 1 is a bottom view of an automobile 100 having an emergency warning system in accordance with an embodiment of the present invention. The emergency warning system includes a battery 102 for providing power to the system, a position sensing switch 104 for detecting the position of the automobile, and warning lights 106 for warning other drivers. The battery 102 is coupled to the position sensing switch 104 by electrical wiring 108. The position sensing switch 104 is coupled to the warning lights 106 by electrical wiring 108.

In the illustrated embodiment, the battery 102 is mounted to a portion of the frame of the automobile located toward the front of the vehicle. The battery 102 can be mounted using a housing made of steel, plastic, or another suitable material. In some embodiments, the battery 102 is a 12 volt battery. However, any suitable battery may be used, including batteries supplying other voltages. In several embodiments, the battery is rechargeable. In one such case, the battery is recharged using a charging system coupled to the standard battery or alternator of the automobile. In some embodiments, the battery is the standard battery of the vehicle.

The position sensing switch 104 can be any suitable switch for detecting a position or an orientation of the vehicle with respect to the ground or ground surface. For example, the position sensing switch may be a mercury switch. Other non-limiting examples of suitable components for a position sensing switch include accelerometers, rolling ball switches, tilt switches, tip over switches, gyroscopes, and the like. In a number of embodiments, the position sensing switch can detect the position and orientation of the automobile with respect to the ground. In some embodiments, the position sensing switch detects whether or not the vehicle is upright. In various embodiments, the position sensing switch includes one or more mercury switches, accelerometers, rolling ball switches, tilt switches, tip over switches, gyroscopes, and the like. In the illustrated embodiment, the position sensing switch is mounted to the undercarriage of the vehicle near a front and center portion of the vehicle. In some embodiments, the position sensing switch can be mounted to other portions of the undercarriage of the vehicle or to other areas of the vehicle other than the undercarriage, such as, for example, the engine compartment.

The warning lights 106 can have any suitable construction. For example, the lights can be light emitting diodes (LEDs). Other non-limiting examples of suitable warning lights include halogen lights, xenon lights, incandescent lights and neon lights. In some embodiments, the warning lights can include rotating lights or strobe lights to better catch the attention of emergency crews or other drivers. In other embodiments, other lights commonly used for emergency vehicles such as ambulances or police vehicles can be used. In the illustrated embodiment, the warning system includes four banks of warning lights 106 that are mounted such that they are approximately evenly spaced apart on the undercarriage of the vehicle. In the illustrated case, two light banks are affixed near the front axle and two light banks are affixed near the rear axel. In other embodiments, the warning lights can be mounted in different locations on the vehicle, may be spaced with each other differently, may include varying numbers of lights or banks of lights, and may include lights of various shapes. In one embodiment, for example, the lights can be mounted to the undercarriage near the wheels of the vehicle. In another, embodiment, a single light is mounted to the undercarriage near the center of the vehicle.

Figure 2:
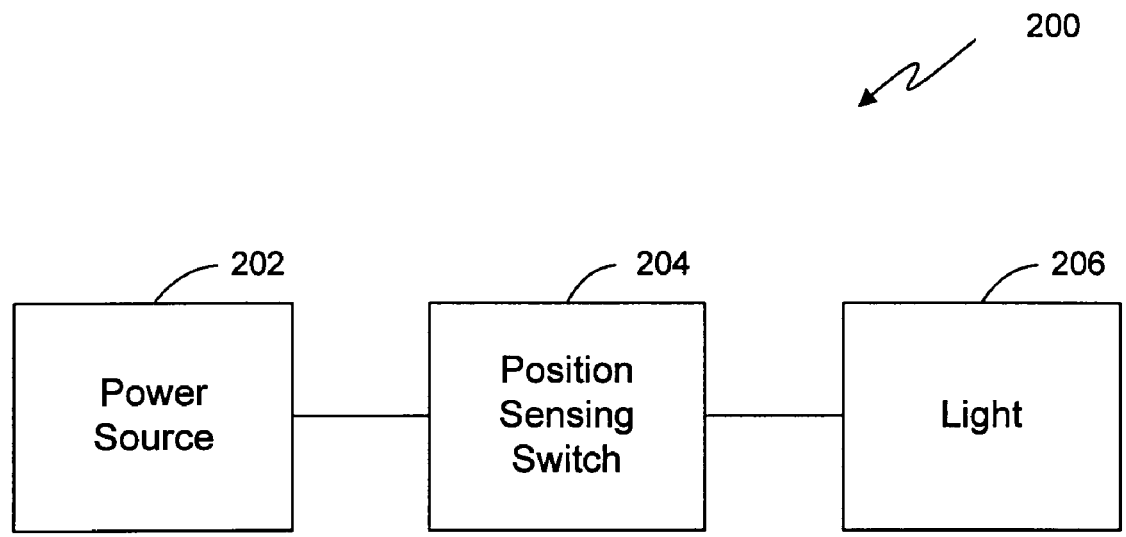
FIG. 2 is a schematic block diagram of an emergency warning system including a position sensing switch in accordance with an embodiment of the present invention.

FIG. 2 is a schematic block diagram of an emergency warning system 200 including a position sensing switch 204 in accordance with an embodiment of the present invention. The position sensing switch 204 is coupled to a power source 202 and a light 206. In several embodiments, the position sensing switch 204 controls the flow of power or current to any number of warning lights.

The power source 202 can be any suitable power source. Non-limiting examples of suitable power sources include the existing or standard automobile battery, one or more fuel cells, one or more external batteries and other energy storage devices. In one embodiment, for example, the power source is the standard battery of the automobile. In several embodiments, the power source 202 can be implemented using the battery described for FIG. 1. Similarly, in some embodiments, the position sensing switch 204 can be implemented using the position sensing switch as described for FIG. 1. In various embodiments, the light 206 can be implemented using the lights described for FIG. 1.

Figure 3:
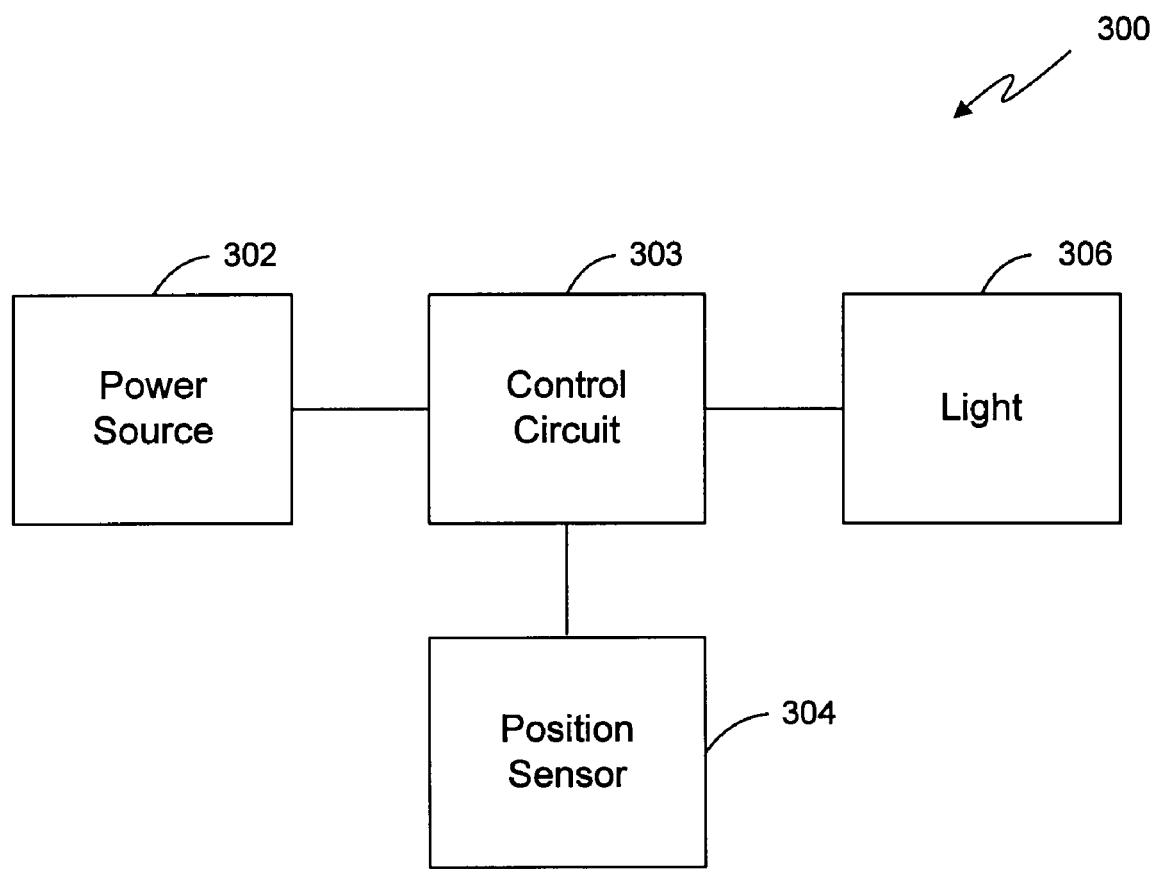
FIG. 3 is a schematic block diagram of an emergency warning system including a control circuit coupled to a position sensor in accordance with an embodiment of the present invention.

FIG. 3 is a schematic block diagram of an emergency warning system 300 including a control circuit 303 coupled to a position sensor 304 in accordance with an embodiment of the present invention. The control circuit 303 is also coupled to a power source 302 and a light 306. The control circuit 303 is configured to control the light 306 based on the input received from the position sensor 304. In one embodiment, the control circuit is coupled to the existing or standard indicator lights of the vehicle. For example, the control circuit can be coupled to any of the turn signal lights, the brake lights, the head lights, the backup lights, or other vehicle lights. In one such case, the control circuit controls the existing or standard vehicle lights (e.g., turn signals, brake lights and the like).

In other embodiments, a set of additional warning lights are coupled to the vehicle in addition to the original vehicle lights. In some embodiments, the control circuit controls both the additional warning lights and the standard vehicle lights. In such case, a variety of lights from different locations on the car can be activated during an emergency that triggers the position sensor. In some embodiments, the light 306 only includes aftermarket lights affixed to the vehicle. As used herein, "aftermarket lights" refers to lights attached to, or installed on, a vehicle after the vehicle has been shipped from the manufacturer of the vehicle.

In some embodiments, the control circuit is also coupled to an audio source. The audio source can be a siren or other warning device that can provide audible warning to drivers or pedestrians in the vicinity of the accident. In some embodiments, the position sensor can include any number of position sensors. For example, in one embodiment, the position sensors may include a number of mercury switches, tilt switches, or tip over type switches.

In several embodiments, the power source 302 can be implemented using the battery described for FIG. 1. In some embodiments, the power source 302 can be implemented using the battery described for FIG. 2. In one embodiment, for example, the power source is the standard battery of the automobile. Similarly, in some embodiments, the position sensor 304 and control circuit 303 can be implemented using any of the position sensing switches as described for FIG. 1 and FIG. 2. In one such case, the position sensor 304 and control circuit 303 are implemented as a mercury switch, a rolling ball switch or a tilt switch. In various embodiments, the light 306 can be implemented using the lights described for FIG. 1.

Figure 4:
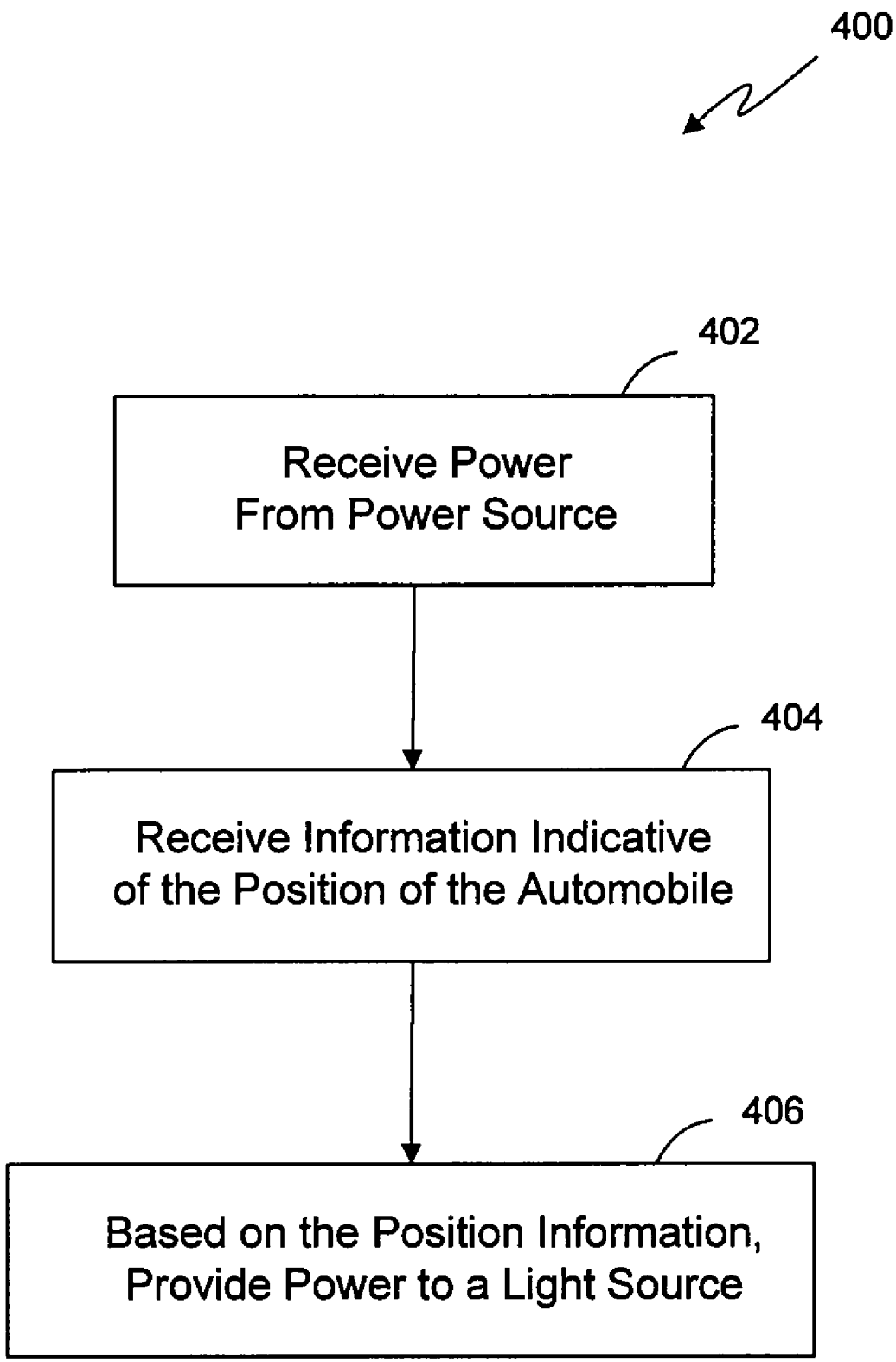
FIG. 4 is a flow chart of a process for operating the control circuit of FIG. 3, in accordance with an embodiment of the present invention.

FIG. 4 is a flow chart of a process 400 for operating the control circuit of FIG. 3 in accordance with an embodiment of the present invention. In block 402, the process receives power from a power source. In block 404, the process receives information indicative of the position of the automobile. In some embodiments, the received information is binary information, indicating whether the automobile is upright or not upright (e.g., resting on a side of the automobile). In other embodiments, the received information can indicate a number of different positions of the automobile. In block 406, the process provides power to at least one light source based on the position information.

In one embodiment, for example, if the position information indicates that the vehicle is resting on a side, then the process provides power to the at least one light source. In another embodiment, if the position information indicates that the vehicle is upside down, then the process provides power to the at least one light source. In other embodiments, the process can use a number of aspects of the position information to control the at least one light source. For example, in one embodiment, the process receives information indicative of the amount of acceleration experienced by the automobile. In such case, the process can provide light to the at least one light source if the amount of acceleration is over a threshold level.

Figure 5:
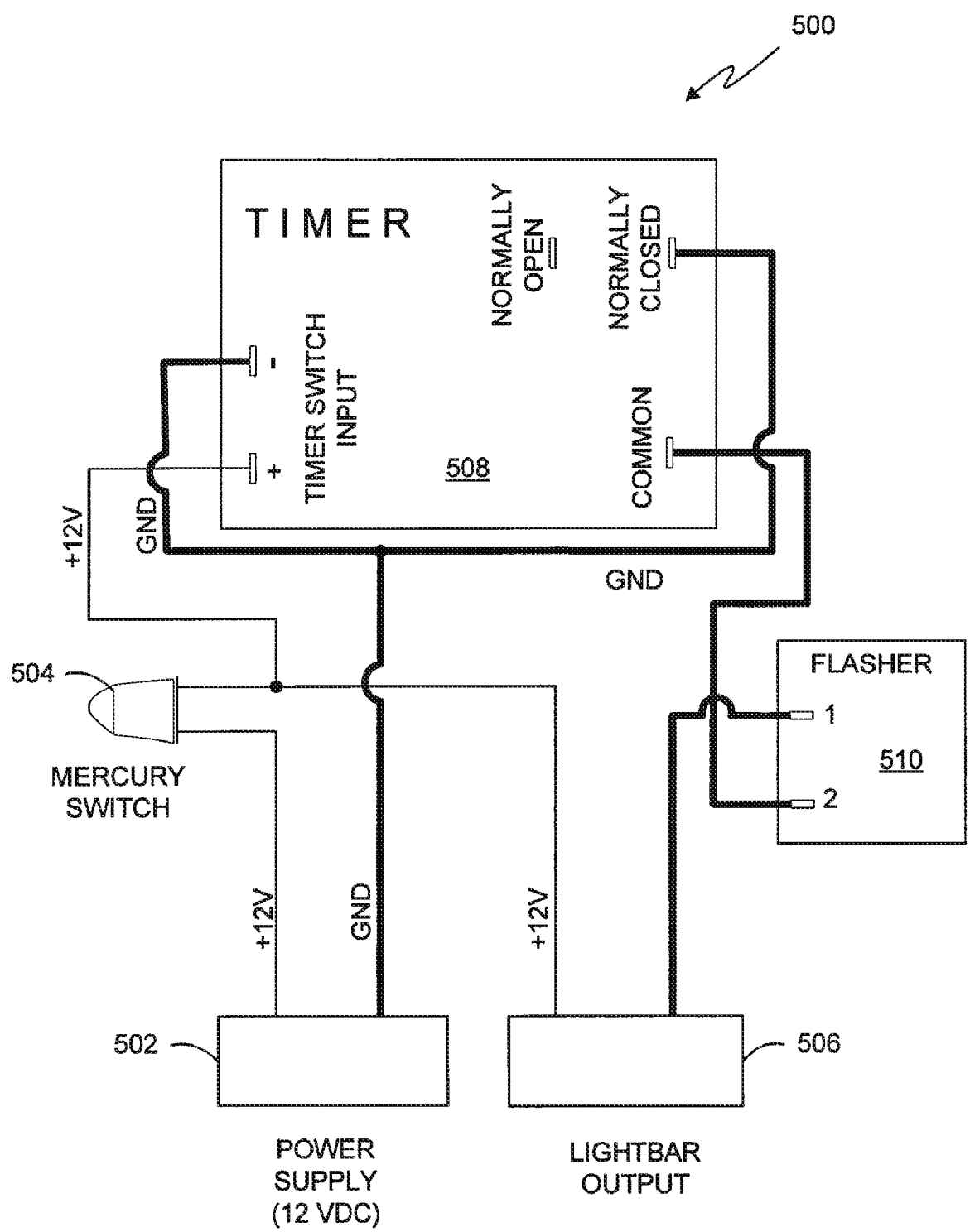
FIG. 5 is a schematic diagram of an emergency warning system having a mercury switch in accordance with an embodiment of the present invention.

FIG. 5 is a schematic diagram of an emergency warning system 500 having a mercury switch 504 in accordance with an embodiment of the present invention. The system 500 includes a power supply input 502 for providing power to the system, the mercury switch 504 for detecting position, an adjustable timer 508 controlling power delivery for programmable time periods, a flasher 510 for cycling power to a light, and a light-bar 506 for providing a visual warning to others.

In the illustrated embodiment, the power supply unit 502 provides a 12 volt direct current (DC) voltage to one terminal of the mercury switch 504. A second terminal of the mercury switch 504 is coupled to a positive switch input of the adjustable timer 508 and to the light-bar 506. A negative switch input of the adjustable timer 508 is coupled to the ground or negative terminal of the power supply 502 and to a normally closed terminal of the timer 508. A common terminal of the timer 508 is coupled to a second terminal of the flasher 510. A first terminal of the flasher 510 is coupled to the light-bar 506. The mercury switch 504 can be mounted to a vehicle such that it can detect when the vehicle is involved in a rollover type accident or another emergency condition. In one embodiment, the mercury switch is mounted as described in the description for FIG. 1 above. In a number of embodiments, electrical coupling is implemented using wire of suitable characteristics for the voltage and current needed to power the components of the system.

In operation, when the mercury switch detects a vehicle rollover, the switch closes to deliver power from the power supply to the adjustable timer. The adjustable timer can then deliver power to the flasher for periodic cycles, where the period of the cycle is adjustable. Once activated, the flasher can provide an oscillating power signal that causes various lights of the light-bar to flash or to display strobe effects.

The power supply can be any suitable power supply capable of powering the light-bar. In some embodiments, for example, the power supply is a 12 volt external battery. In one such embodiment, the power supply is a BP3-12 valve regulated lead-acid rechargeable battery made by B & B Battery USA, Inc. of Commerce, Calif. In another embodiment, the battery of the vehicle, or the standard battery, is used for the power supply. The mercury switch may be any suitable mercury switch. In one embodiment, for example, the mercury switch is a CM1260 mercury switch made by Comus International of Clifton, N.J. In other embodiments, the mercury switch can be replaced with any one of the position sensing switches described above. In some embodiments, the mercury switch is implemented using more than one mercury switch or using more than one other position sensing switch.

Similarly, the adjustable timer may be any suitable adjustable timer. In some embodiments, for example, the adjustable timer is a HDFA Series Adjustable Recycling Time Delay Relay made by Amperite Company of West New York, N.J. The flasher may be any suitable flasher. In one such embodiment, for example, the adjustable timer is configured to allow 3 flashes per second. In some embodiments, the flasher is a DF Series Flasher made by Amperite Company of West New York, N.J. In one such case, the flasher is configured for 120 flashes per minute. In several embodiments, the flasher controls the cycle of oscillation and the timer controls the periods of time that the flasher is enabled. Thus, in some embodiments, the combination of the timer and the flasher allows a user of the emergency warning system to have complete control over the flash cycle and the period of oscillation of the flasher.

The light-bar can be any suitable combination of lights. In one embodiment, for example, the light-bar is a 12 volt LED light strip made by 3M of St. Paul, Minn. In other embodiments, the light-bar includes any number of lights common to emergency vehicles such as ambulances or police vehicles. The light-bar can be mounted to the undercarriage of a vehicle such that it is, to the greatest degree possible, visible to approaching vehicles. In a number of embodiments, the light-bar is mounted to the undercarriage of the vehicle such that the light-bar is both visible to approaching vehicles when the vehicle is resting on its side and sufficiently recessed such that the light-bar is unlikely to be damaged when the vehicle passes over debris on a roadway.

Figure 6:
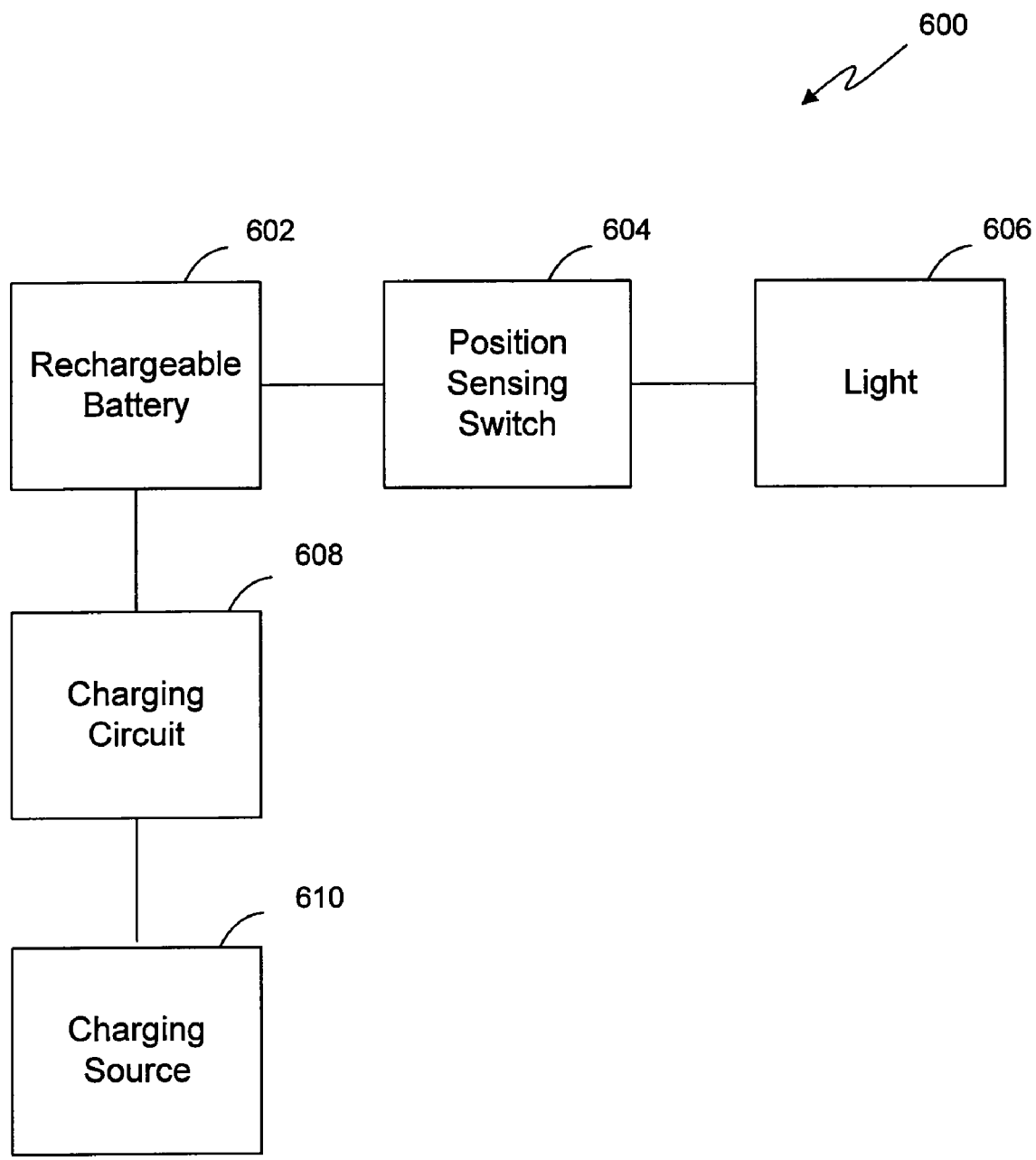
FIG. 6 is a schematic block diagram of an emergency warning system having a charging circuit in accordance with an embodiment of the present invention.

FIG. 6 is a schematic block diagram of an emergency warning system 600 having a charging circuit 608 in accordance with an embodiment of the present invention. The system 600 includes a rechargeable battery 602 for providing power to the system, a position sensing switch 604 for detecting the position of an automobile, a light 606 for warning other drivers in the vicinity of the automobile, a charging circuit 608 for charging the rechargeable battery, and a charging source 610 for providing power to recharge the battery. The charging circuit 608 is coupled to the rechargeable battery 602 and to the charging source 610. In most embodiments, the charging source 610 is the standard automobile battery or the standard alternator of the vehicle having the emergency warning system. The position sensing switch 604 is coupled to the rechargeable battery 602 and the light 606.

In other embodiments, the warning system 600 includes a control circuit that responds to input received from the position sensing switch 604 to activate the light 606. In some embodiments, the light includes one or more warning lights common to emergency vehicles such as ambulances or police vehicles. In several embodiments, the charging circuit and charging source can be used with any of the emergency warning systems described above.

In operation, the charging circuit can monitor the level of energy (e.g., voltage) stored in the rechargeable battery 602. Based on the level of energy, the charging circuit enables a charging voltage to be applied to the rechargeable battery for a predetermined period of time or until the level of stored energy is increased to a predetermined level.

While the present invention has been illustrated and described with reference to certain exemplary embodiments, those of ordinary skill in the art understand that various modifications and changes may be made to the described embodiments without departing from the spirit and scope of the present invention as defined by the following claims.

What is claimed is:

1. A warning system for a vehicle having an existing vehicle power source, the warning system comprising:
   a control circuit;
   at least one position sensor coupled to the control circuit;
   at least one light source coupled to the control circuit and configured to be mounted on an undercarriage of the vehicle; and
   a warning system power source coupled to the control circuit and configured to power the warning system independent of the existing vehicle power source;
   wherein the control circuit is configured to automatically activate the at least one light source responsive to the position sensor by delivering a current from the warning system power source to the at least one light source.

2. The warning system of claim 1, wherein the control circuit and the at least one position sensor comprise a mercury switch.

3. The warning system of claim 1, wherein the control circuit and the at least one position sensor comprise a switch selected from the group consisting of mercury switches, rolling ball switches, tilt switches, tip over switches, and combinations thereof.

4. The warning system of claim 1, wherein the position sensor is selected from the group consisting of mercury switches, rolling ball switches, tilt switches, accelerometers, gyroscopes, and combinations thereof.

5. The warning system of claim 1, wherein the control circuit comprises:
a flasher circuit coupled to the at least one light source, the flasher circuit configured to intermittently activate the light source.

6. The warning system of claim 5, wherein the control circuit further comprises:
a timer circuit coupled to the flasher circuit and to the position sensor, the timer circuit configured to activate the flasher for a period of time.

7. The warning system of claim 1, wherein the warning system power source comprises a battery.

8. The warning system of claim 7, further comprising a charging circuit coupled to the battery and to the existing vehicle power source, the charging circuit being configured to charge the battery.

9. The warning system of claim 8, wherein the existing vehicle power source is selected from the group consisting of a standard battery of the vehicle and an alternator of the vehicle.

10. The warning system of claim 1, wherein the at least one light source comprises an LED.

11. The warning system of claim 1, wherein the at least one light source comprises a standard light of the vehicle.

12. The warning system of claim 1, wherein the at least one light source is selected from the group consisting of LEDs, halogen lights, incandescent lights, xenon lights, neon lights, and combinations thereof.

13. The warning system of claim 1, wherein the at least one light source is selected from the group consisting of rotating lights, strobe lights, and combinations thereof.

14. The warning system of claim 1, further comprising an audio source coupled to the control circuit, the audio source configured to generate one or more warning sounds.

15. The warning system of claim 14, wherein the audio source comprises a siren.

16. The warning system of claim 1, wherein the control circuit is configured to automatically activate the at least one light source responsive to the position sensor indicating that the vehicle is resting on a side of the vehicle.

17. The warning system of claim 1, wherein the vehicle is selected from the group consisting of a car, a truck, and a tractor-trailer.

18. The warning system of claim 1, wherein the control circuit is configured to activate the at least one light source when the at least one position sensor indicates that the vehicle is in a position selected from the group consisting of resting on a side of the automobile and resting upside down.

19. A method of generating a warning concerning a condition of a vehicle having an existing vehicle power source, the method comprising:
providing a warning system comprising:
at least one position sensor,
at least one light source, and
a warning system power source configured to power the warning system independent of the existing vehicle power source;
detecting at least one position of the vehicle using the at least one position sensor; and
automatically activating the at least one light source in response to the at least one position by delivering a current from the warning system power source to the at least one light source, the at least one light source being mounted on an undercarriage of the vehicle.

20. A vehicle comprising:
a vehicle body having an undercarriage;
an existing vehicle power source; and
a warning system comprising:
a control circuit;
at least one position sensor coupled to the control circuit;
at least one light source coupled to the control circuit and mounted on the undercarriage of the vehicle body; and
a warning system power source coupled to the control circuit and configured to power the warning system independent of the existing vehicle power source;
wherein the control circuit is configured to automatically activate the at least one light source responsive to the position sensor by delivering a current from the warning system power source to the at least one light source.

21. The vehicle of claim 20, wherein the warning system further comprises a charging circuit coupled to the warning system power source and to the existing vehicle power source, the charging circuit being configured to charge the warning system power source.

* * * * *